(12) United States Patent
Brewster et al.

(10) Patent No.: US 11,512,378 B2
(45) Date of Patent: Nov. 29, 2022

(54) COATING

(71) Applicant: ROLLS-ROYCE plc, London (GB)

(72) Inventors: James G. Brewster, Derby (GB); Joao P. Martins, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/087,202

(22) Filed: Nov. 2, 2020

(65) Prior Publication Data
US 2021/0140028 A1     May 13, 2021

(30) Foreign Application Priority Data
Nov. 8, 2019   (GB) ...................... 1916269

(51) Int. Cl.
| | | |
|---|---|---|
| B32B 15/04 | (2006.01) |
| C23C 4/134 | (2016.01) |
| C23C 4/073 | (2016.01) |
| C23C 28/00 | (2006.01) |
| B32B 15/20 | (2006.01) |
| F01D 1/00 | (2006.01) |

(52) U.S. Cl.
CPC .............. *C23C 4/134* (2016.01); *B32B 15/04* (2013.01); *B32B 15/20* (2013.01); *C23C 4/073* (2016.01); *C23C 28/321* (2013.01); *C23C 28/325* (2013.01); *C23C 28/3455* (2013.01); *F01D 1/00* (2013.01); *B32B 2255/06* (2013.01); *B32B 2255/20* (2013.01); *B32B 2255/205* (2013.01); *B32B 2255/28* (2013.01); *B32B 2307/304* (2013.01); *F05D 2260/231* (2013.01); *F05D 2300/10* (2013.01); *F05D 2300/173* (2013.01); *F05D 2300/611* (2013.01)

(58) Field of Classification Search
None
See application file for complete search history.

(56) References Cited

U.S. PATENT DOCUMENTS

| | | |
|---|---|---|
| 6,555,179 B1 | 4/2003 | Reeves et al. |
| 2018/0299265 A1 | 10/2018 | Haack et al. |

FOREIGN PATENT DOCUMENTS

| | | | |
|---|---|---|---|
| EP | 1 088 908 A2 | 4/2001 |

OTHER PUBLICATIONS

Nov. 20, 2020 Extended Search Report issued in European Patent Application No. 20201261.3.

*Primary Examiner* — Adam Krupicka
(74) *Attorney, Agent, or Firm* — Oliff PLC

(57) ABSTRACT

A method of assessing the quality of a bond coat for bonding a ceramic coating to a metallic substrate comprises determining a thresholded summit area for the bond coat.

9 Claims, 8 Drawing Sheets

COATING

This specification is based upon and claims the benefit of priority from UK Patent Application Number GB 1916269.2 filed on 8 Nov. 2019, the entire contents of which are incorporated herein by reference.

BACKGROUND

Field of the Disclosure

The present disclosure relates to coatings, in particular ceramic coatings on metallic substrates.

Background of the Disclosure

Ceramic coatings are used for a variety of purposes, such as thermal barrier coatings (including rare-earth oxide doped ceramic oxides); wear resistant ceramic-coated materials; environmental barrier coatings (including rare-earth oxide-silicates); and abradable ceramic coatings.

In particular, thermal barrier coatings (TBCs) are utilised on metallic components and typically comprise a ceramic layer adhered to the underlying metallic substrate by a bond coat.

TBCs are typically used for components which operate at high temperatures under thermal-mechanical loading, induced by the thermal cycling of the component. The TBC allows the metallic component to be used above temperatures than it would otherwise be able to withstand (e.g. above the melting point of an uncoated metallic component) by virtue of the low thermal conductivity of the ceramic layer.

A TBC is effective as long as it remains attached to the substrate. As such, it is important for the bond coat to provide good adhesion between the metallic substrate and the ceramic layer.

SUMMARY OF THE DISCLOSURE

According to a first aspect there is provided a method of assessing the quality of a bond coat for bonding a ceramic coating to a metallic substrate, the method comprising determining a thresholded summit area value, $S_{sth}$, for the bond coat, given by:

$$S_{sth} = \frac{1}{A} \sum_{i=1}^{n} S_{si}$$

where A is the total surface area sampled, n is the number of thermo-mechanically dominant summits present in the area sampled and $S_{si}$ is the area of an individual thresholded summit.

Optionally, the substrate is: an alloy, optionally an iron-, nickel- or cobalt-based superalloy; a refractory metal or an inter-metallic.

Optionally, the bond coat material is a metallic alloy, optionally an alloy containing aluminium, silicon, or chromium.

Optionally, the bond coat is applied to the metallic substrate using one or more thermal spraying process, such as air plasma spraying (APS); high velocity oxygen fuel thermal spraying (HVOF); high velocity air fuel spraying (HVAF); low pressure plasma spraying (LPPS)/vacuum plasma spraying (VPS); or cold spraying.

Optionally, determining a thresholded summit area further comprises applying a low pass filter to remove micro-roughness features from the calculation of the thresholded summit area, wherein the micro-roughness features are optionally less than or equal to 5 µm in height.

Optionally, determining a thresholded summit area further comprises setting a threshold height, either (a) as an absolute height when interfacial morphological features in the total surface area sampled, A, of the bond coat are within the same order of magnitude; or (b) as a percentage of a maximum feature height of interfacial morphological features in the total surface area sampled, A, of the bond coat, when the interfacial morphological features in the total surface area sampled, A, are not within the same order of magnitude.

Optionally, the bond coat is part of a thermal barrier coating.

According to a second aspect, there is provided a method of optimising a process for creating a bond coat for bonding a ceramic coating to a metallic substrate, the method comprising: assessing the quality of a bond coat for a ceramic coating on a metallic substrate, according to any variation of the first aspect, for bond coats deposited under different conditions, and; selecting the conditions that provide the largest thresholded summit area.

According to a third aspect, there is provided a bond coat for bonding a ceramic coating to a metallic substrate produced by a process optimised according to the second aspect.

According to a fourth aspect, there is provided bond coat for bonding a ceramic coating to a metallic substrate, wherein the bond coat has a thresholded summit area ($S_{sth}$) of 11% or more, wherein the thresholded summit area, $S_{sth}$, is given by:

$$S_{sth} = \frac{1}{A} \sum_{i=1}^{n} S_{si}$$

where A is the total surface area sampled, n is the number of thermo-mechanically dominant summits present in the area sampled and $S_{si}$ is the area of an individual thresholded summit.

Optionally, for the bond coat of the third or fourth aspect, the bond coat material is a metallic alloy, optionally an alloy containing aluminium, silicon, or chromium.

Optionally, for the bond coat of the third or fourth aspect, the bond coat is applied to the metallic substrate using one or more thermal spraying process, such as air plasma spraying (APS); high velocity oxygen fuel thermal spraying (HVOF); high velocity air fuel spraying (HVAF); low pressure plasma spraying (LPPS)/vacuum plasma spraying (VPS); or cold spraying.

According to a fifth aspect, there is provided a ceramic coating system comprising the bond coat according to any one of the variations of the third and fourth aspects, wherein the ceramic coating system further comprises: a metallic substrate; and a ceramic layer; wherein the bond coat is formed on the metallic substrate, and the ceramic layer is formed on the bond coat.

Optionally, the ceramic coating system is a thermal barrier coating system.

According to a sixth aspect, there is provided a component for a gas turbine engine, the component comprising a ceramic coating system according to the fifth aspect.

According to a seventh aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein a component of the gas turbine engine is a component according to claim sixth aspect.

According to an eighth aspect, there is provided a gas turbine engine according to the seventh aspect, wherein: the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached.

Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
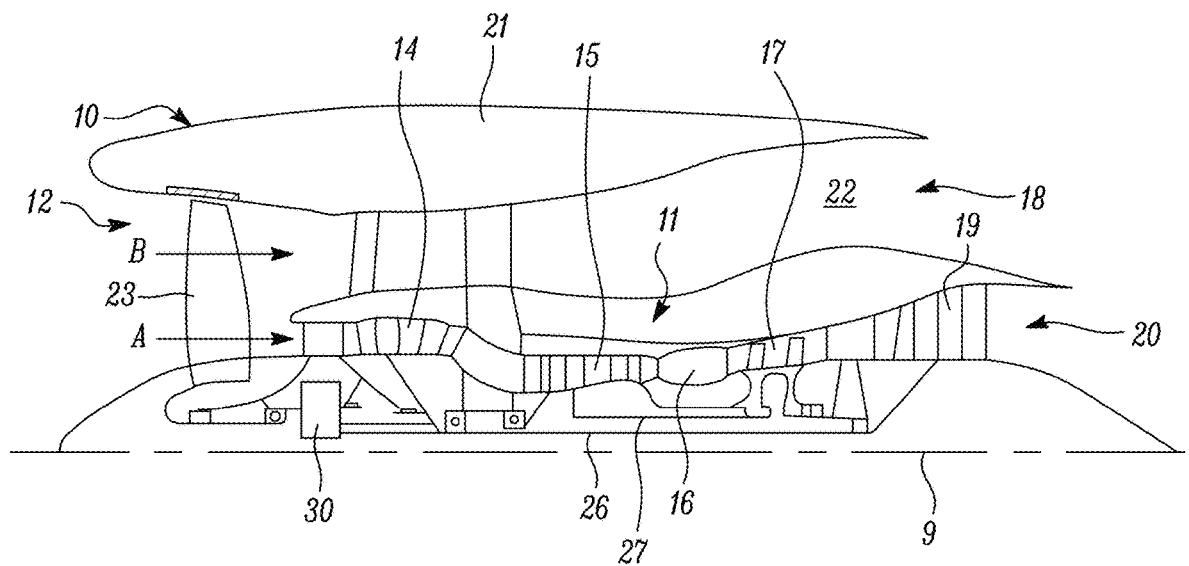
FIG. 1 is a sectional side view of a gas turbine engine.

FIG. 1 illustrates a5 gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
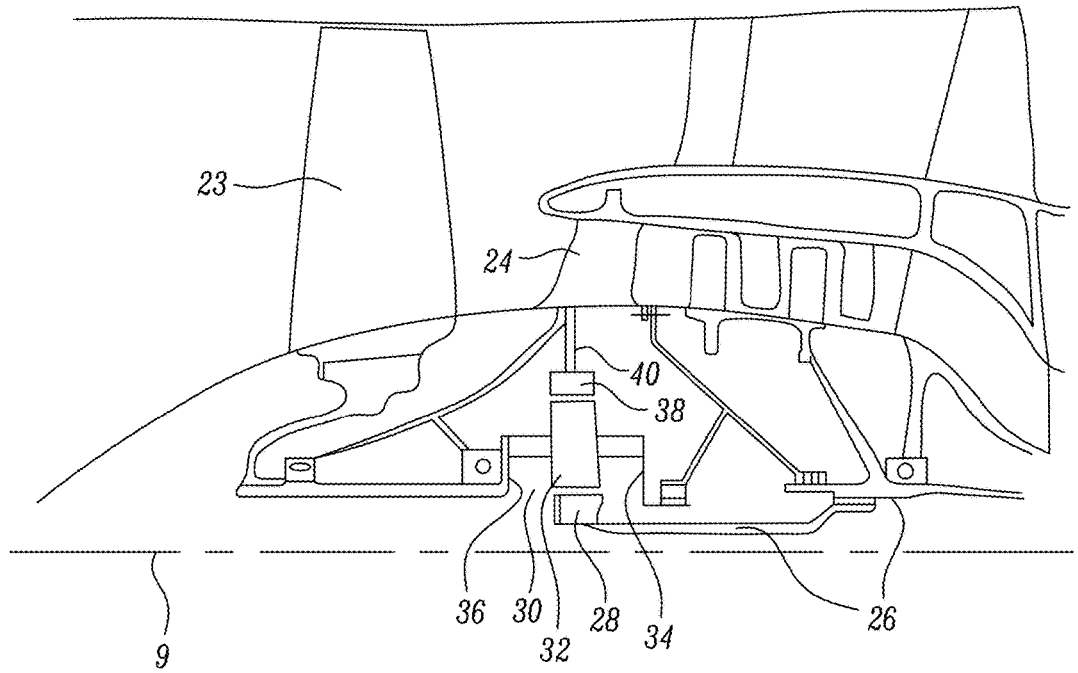
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
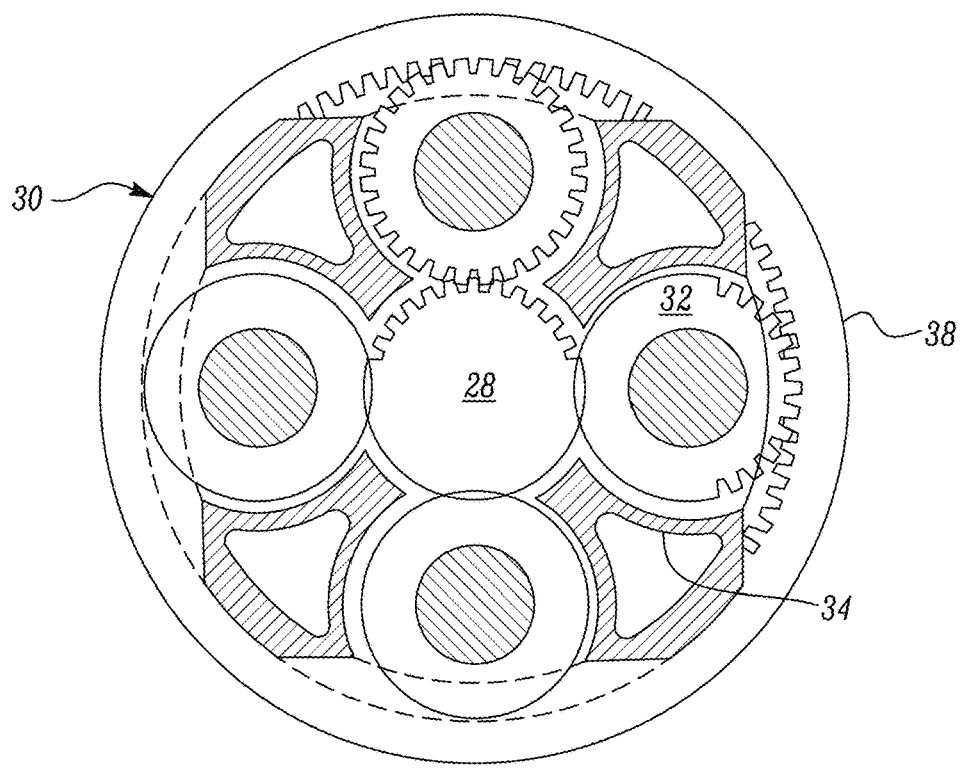
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Components of the gas turbine operate at very high temperatures. As such, they may incorporate a thermal barrier coating.

Figure 4:
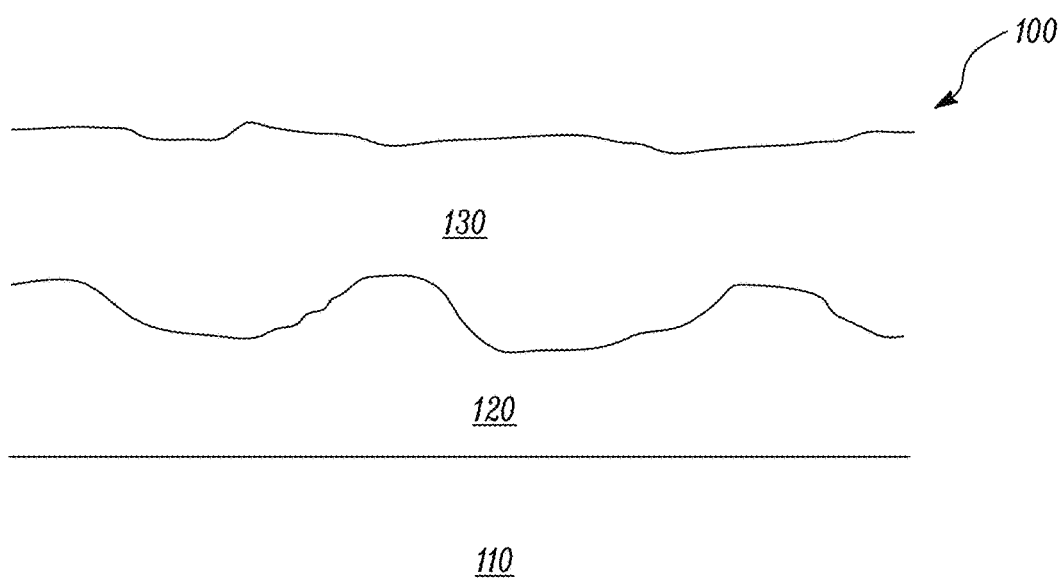
FIG. 4 is a schematic cross-section through a ceramic coating system.

FIG. 4 illustrates the structure of a thermal barrier coating (TBC) system 100, consisting of a thermal-insulating ceramic layer 130 bonded to a substrate 110, with an intermediate bond coat 120.

As previously mentioned, TBCs are typically used for components which operate at high temperatures and under thermal-mechanical loading, induced by the thermal cycling of the component. The TBC allows the metallic component to be used above temperatures than it would otherwise be able to withstand (e.g. above the melting point of an uncoated metallic component) by virtue of the low thermal conductivity of the ceramic layer. However, strains are generated within the TBC due to the coefficient of thermal expansion (CTE) mismatch between the substrate/bond coat and ceramic.

The substrate 110 may be any alloy, including iron, nickel or cobalt-base superalloys, refractory metals or inter-metallics.

The bond coat 120 may consists of an oxidation resistant overlay coating. The bond coat 120 can be any metallic alloy which contains elements (e.g. aluminium, silicon, chromium) in order to form a slow growing oxide scale (e.g. alumina, silica, chromia). The bond coat 120 can be formed using a thermal spray process such as air plasma spraying (APS), vacuum plasma spraying (VPS)/low pressure plasma spraying (LPPS) or high velocity oxy-fuel (HVOF).

The bond coat 120 may be applied in a single step or multiple application steps.

Additional surface enrichment (e.g. pack or vapour cementation, sputtering) or surface modification processes (e.g. grit blasting, shot peening, vibro-polishing), could also be applied before, after or in-between the thermal spraying bondcoat application The ceramic layer 130 can be a yttria-stabilized zirconia (YSZ) ceramic deposited by as air plasma spraying (APS), vacuum plasma spraying (VPS)/low pressure plasma spraying (LPPS) or high velocity oxy-fuel (HVOF).

The thermal cycling typically experienced by components with TBCs can lead to spallation—i.e. the flaking away of the TBC as the bond to the metallic substrate fails.

The variety of methods of depositing the bond coat 120, and the various parameters involved for each such method, means that it has been difficult to quantify the best way of forming the bond coat to maximise "spallation life". Thermal cycling exposure can be simulated using a laboratory test where TBC coated metallic samples are subjected to repeated thermal cyclic exposure followed by air cooling to room temperature. The durability of the system or spallation lifetime can be determined by considering the time to reach 50% TBC loss (by area), for example. However, a comprehensive measure that is reliably indicative of the spallation lifetime has remained elusive.

To date, most investigation has focussed on enhancing the surface roughness of the bondcoat in order to extend the TBC lifetime via reduction of the overall stress state in the vicinity of the interface, with the roughness typically being characterised using the two-dimensional parameter Arithmetical Mean Roughness, $R_a$ (see ASME B46.1 or ISO 25178-Part 607), or alternatively $S_a$, which is the three-dimensional extension of the $R_a$ parameter to a surface. Previous investigations have focussed on maximising the roughness or achieving a specific target roughness range.

However, the present inventors have shown that either a two or three-dimensional roughness parameter alone (characterised by $R_a$ or $S_a$) cannot satisfactorily explain the experimental results obtained and therefore its applicability for the prediction of TBC spallation performance is not adequate. As a consequence, a novel alternative parameter that displays a more effective correlation with TBC spallation performance has been developed.

Experimental Results

A set of samples comprised by 12 different TBC systems were produced on Special Metals' (Hereford, UK) NIMONIC® alloy 263 (Ni-based superalloy) substrates, each system comprised of 8 specimens fabricated under the same conditions. Prior to deposition of the bond coat, the substrates were prepared by grit-blasting with Guyson (North Yorkshire, UK) #60 white alumina, followed by the deposition of 0.25 mm thick bond coats by resorting to a combination of both APS and/or HVOF processes whilst using powders with the following nominal compositions and size ranges:

Powder compositions (wt %): Co-32Ni-21Cr-8Al-0.5Y & Ni-22Co-17Cr-12.5Al-0.6Y-0.3Hf-0.4Si Powder particle size ranges: 90/45 µm, 75/45 µm, 38/10 µm In each case the bond coat deposition process and parameters were modified to achieve relatively high bond coat densities, low oxide contents and a range of morphologically distinct surface topographies. The samples were subsequently heat treated at 1100° C. for 1 hr in a partial pressure argon atmosphere, followed by the deposition of a 0.35 mm thick 8 wt. % YSZ TBC using APS.

The spallation lifetimes of each of the sets of TBC coated test samples were then determined by a repeated thermal cyclic exposure (0.5 hr of ramping up time, 11 hr hot dwell at 1135° C.) and followed by slow air/cooling to room temperature (11 hr cool down inside the furnace). The durability of the system or spallation lifetime was determined by considering the time to reach 50% TBC loss (by area), and expressed as a life fraction, $L_f$, calculated as a percentage of the maximum lifetime achieved by the highest performance TBC system, hereby defined as the reference system. The reference system in this work is the 38/10 µm Co-32Ni-21Cr-8Al-0.5Y system applied by HVOF only.

Figure 5:
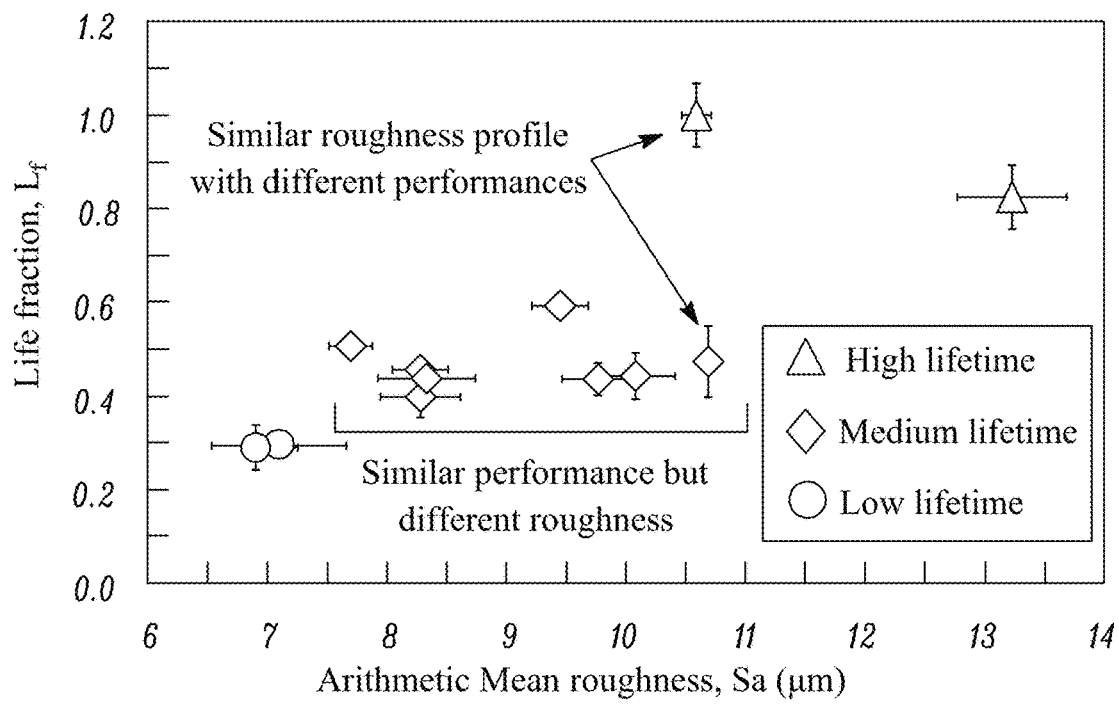
FIG. 5 is a graph showing how spallation lifetime, represented as life fraction of the highest performance sample, varies with the arithmetic mean roughness, $S_a$, of the bond coat interface.

The bond coat surface topographies of each of the samples were characterised via a surface characterisation technique (i.e. laser confocal scanning microscopy) in accordance with the ISO 25178-Part 607 standard. The arithmetic mean roughness ($S_a$) of the bond coat surface was then determined for each sample and the results of these tests are shown in FIG. 5, which plots $L_f$ as a function of $S_a$. From that graph it can be seen that specimens with very similar roughness values can have considerably different life fractions, whereas specimens with similar life fractions can have very different $S_a$ values. In addition, FIG. 5 also shows that even though a specimen displays higher $S_a$, it does necessarily mean that it will achieve the highest lifetime.

Figure 12:
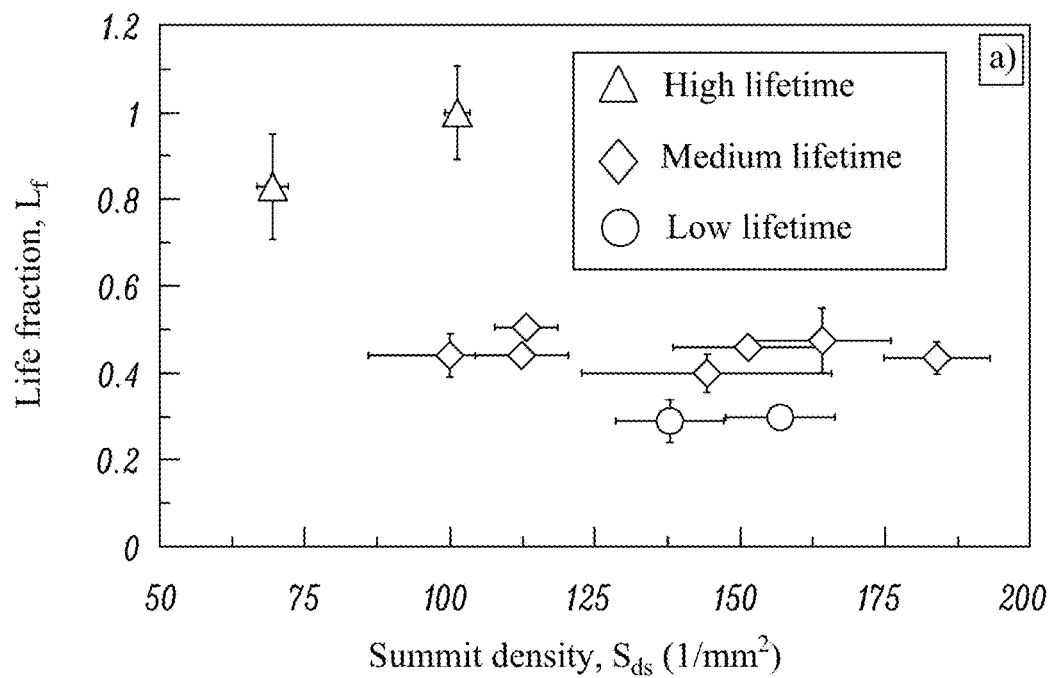
FIG. 12 presents two graphs showing how spallation lifetime, represented as life fraction of the highest performance sample, varies with (a) summit density ($S_{ds}$) and (b) summit curvature ($S_{pc}$).
Figure 12:
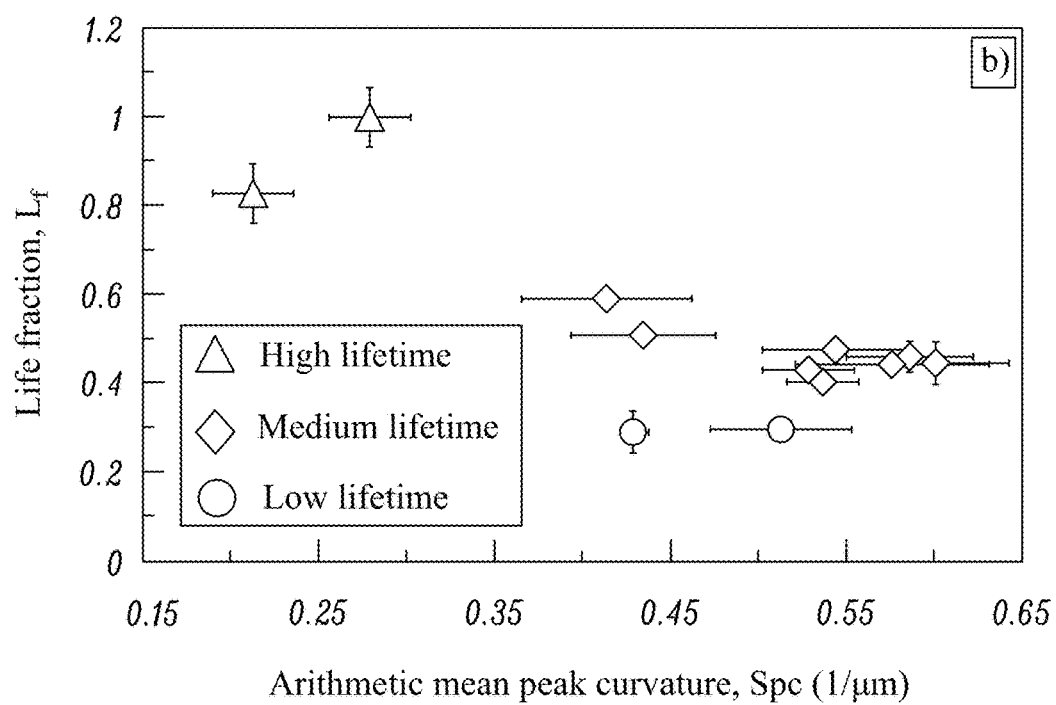

Further to this, the analysis of the surface topography data yielded results which indicated that the highest performing systems were found to not to be solely associated with higher $S_a$ values, but also to other surface descriptors, such as summit density ($S_{ds}$) and summit curvature ($S_{pc}$), as can be seen in FIGS. 12a and 12b, respectively. In agreement with the ISO/TC 213 N057 2004 standard and EUR 15178 EN, the Sds parameter is defined as being a three-dimensional hybrid parameter that represents the average number of summits per unit of area of a surface. For the purpose of this work, the aforementioned summits were derived from peaks (i.e. any point above all 8 nearest neighbours) and are defined as areas separated by at least 1% of the minimum "X" and "Y" dimension that can only be found above the threshold of 5% $S_z$ above the mean plane. From a bond coat interface surface topography perspective, these summits represent the thermo-mechanically dominant higher relief regions that form during the bond coat deposition process and are believed to have a larger impact in the alteration of the topcoat splat morphology upon deposition of the TBC and resulting overall stress-state distribution in the vicinity of the interface. The respective mathematical description of this parameter is shown below:

$$S_{ds} = \frac{n° \text{ of summits above the imposed threshold limit}}{\text{total area measured}}$$

On the other hand, $S_{pc}$ is the arithmetic mean summit curvature and represents the arithmetic mean of the principal curvatures of the aforementioned summits on the XY plane of the sampled area. Thus, it allows for the quantification and comparison of the predominant summit curvature profile for different surface topographies as it actively affects the way that the impinging droplets deform upon deposition of the TBC layer. The mathematical description of this parameter is shown below:

$$S_{pc} = \frac{1}{2n}\sum_{k=1}^{n}\left(\frac{\partial^2 z(i,j)}{\partial x^2} + \frac{\partial^2 z(i,j)}{\partial y^2}\right)$$

where n is the number of summits in the area analysed and z(i,j) the height element for a specific set of (i,j) coordinates.

A correlation between high life fraction and lower values of summit density and respective mean curvature has been found for these parameters, thus providing evidence that the morphological features described by them have a significant effect on the TBC spallation life. This correlation provides experimental evidence that an accurate quantitative description and differentiation of different BC surface topographies is better achieved when using other three-dimensional surface descriptors in addition to the already well-known arithmetic mean roughness. However, as can be concluded from the analysis of the $L_f$ relationship with $S_a$, $S_{pd}$ and $S_{pc}$, illustrated in FIGS. 5, 12a and 12b respectively, not all data points are congruent with the overall dataset trend.

Figure 6:
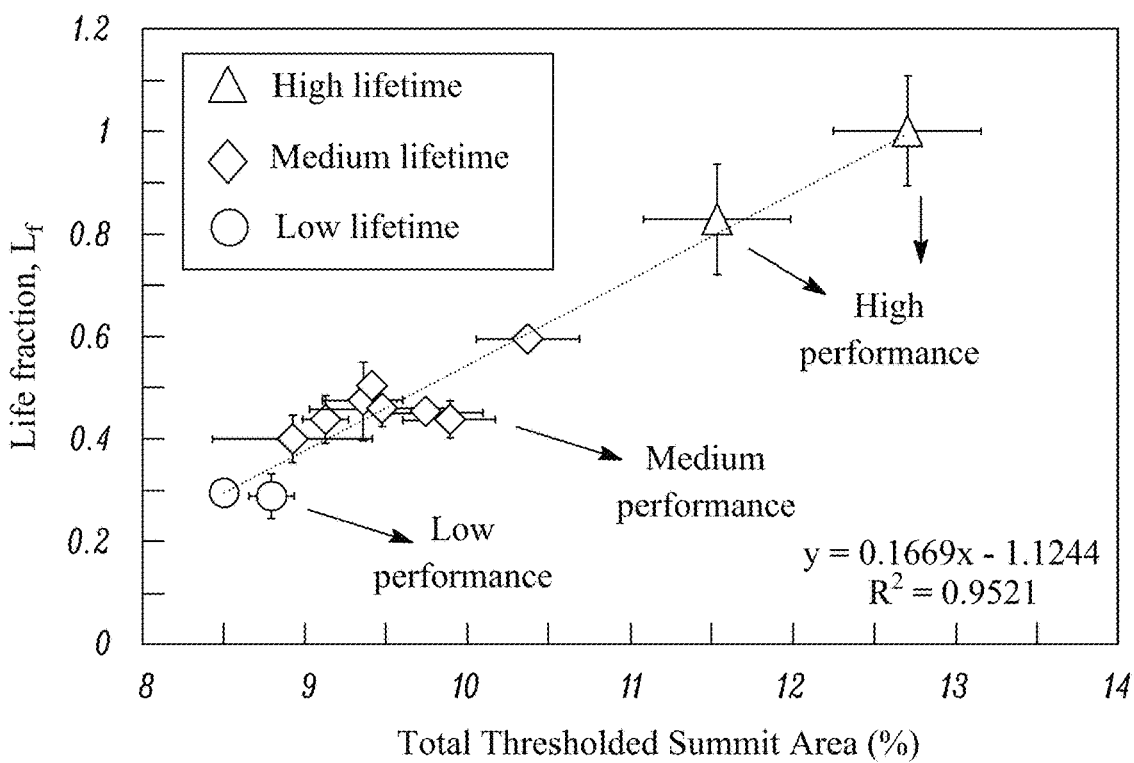
FIG. 6 is a graph showing how spallation lifetime, represented as life fraction of the highest performance sample, varies with thresholded summit total area, $S_{sth}$, of the bond coat interface.

As a consequence, a three-dimensional surface descriptor, denominated total thresholded summit area (i.e. $S_{sth}$) has been formulated with the purpose of quantitatively describing and differentiating different bond coat topographies more effectively than these three parameters combined, whilst providing a meaningful correlation with TBC spallation lifetime. The relationship between the high-performance TBC systems and bond coat surface topography was found to be most reliably characterised by the $S_{sth}$ parameter and is presented in FIG. 6, wherein the linear correlation found between $L_f$ and $S_{sth}$ yielded a coefficient of determination, $R^2$, of 0.95 upon implementing a least square regression fit on the dataset. The methodology utilised to determine the thresholded summit area ($S_{sth}$) parameter is described below.

Figure 7:
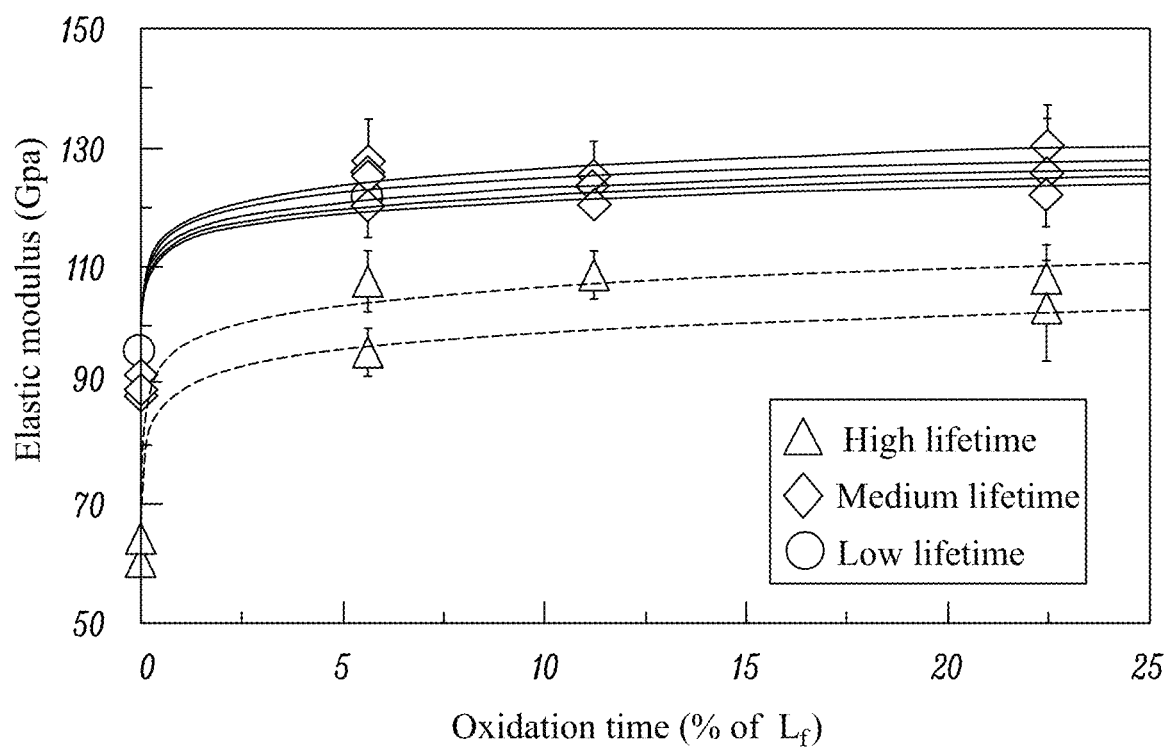
FIG. 7 is a graph showing how the $S_{sth}$ parameter indirectly affects the TBC elastic modulus and how it varies with oxidation time for different coatings.
Figure 8:
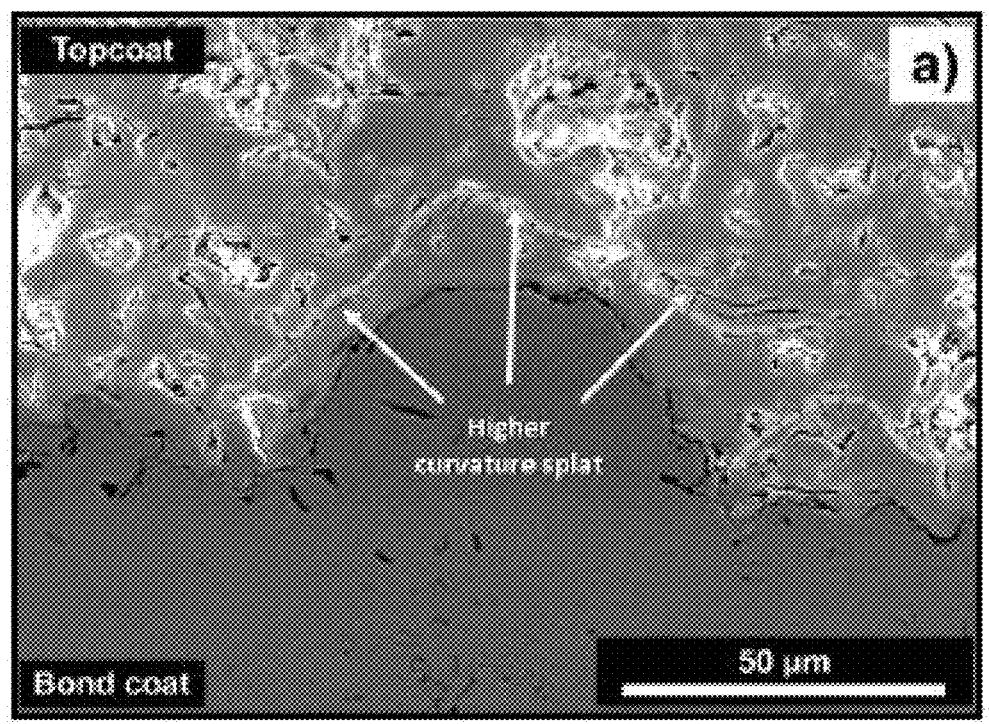
FIG. 8 presents secondary emission micrographs illustrating the different interface morphological features of the bond coat interface resulting from having (a) high $S_{sth}$ bond coat surface with large radii convex asperities and (b) lower $S_{sth}$ bond coat surface with small radii convex asperities.
Figure 8:
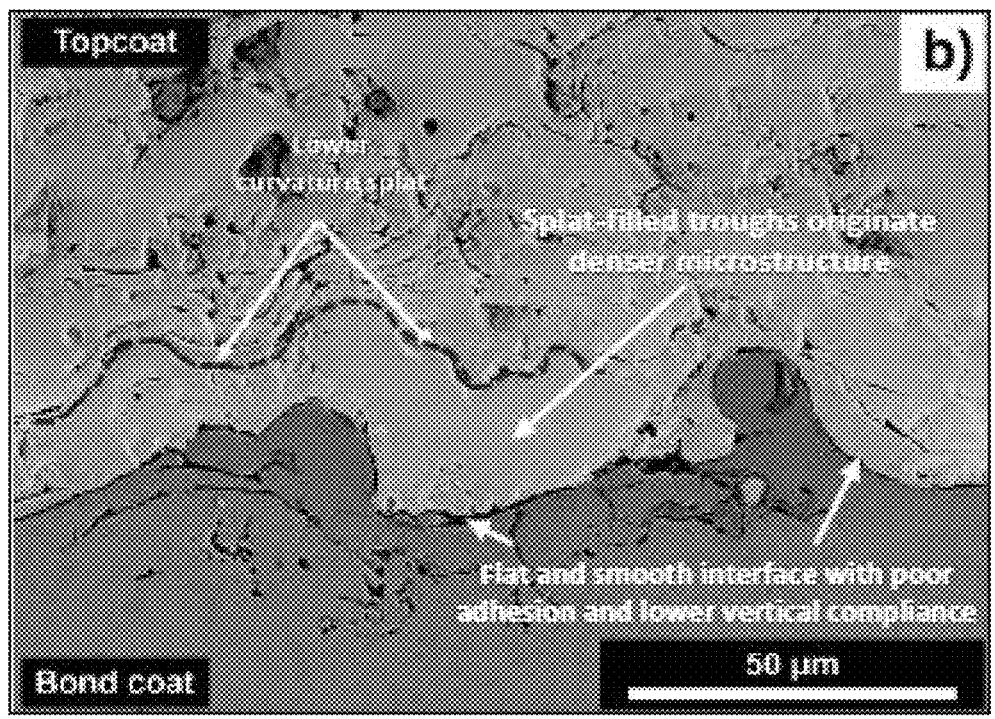

The compliance of the TBCs has also been measured using depth instrument micro-indentation in order to assess the effect of different bond coat topographies on the TBC layer mechanical properties, Depth-instrumented indentation testing was performed using a microindentation tester (MHT[3], Anton Paar) equipped with a square-based pyramidal diamond indenter tip (i.e. Vickers indenter) at room temperature. The in-plane elastic modulus or indentation modulus ($E_{ind}$) were derived from the slope of the unloading section of the load-displacement curve using the Oliver & Parr method (Oliver, W. C., and G. M. Pharr. "An Improved Technique for Determining Hardness and Elastic Modulus Using Load and Displacement Sensing Indentation Experiments.", Journal of Materials Research, vol. 7, no. 6, 1992, pp. 1564-1583). The experimental parameters selected for the indentation procedure were a loading/unloading rate of 4N/min with a hold time of 10 seconds and a 10 Hz data acquisition rate. The variation of the elastic modulus of the TBC in the vicinity of the interface with oxidation time are shown in FIG. 7. The results show that the elastic modulus was found to be lower in specimens that displayed higher $S_{sth}$ values (i.e. triangles in FIG. 7), compared to the lower $S_{sth}$ samples (i.e. circular and diamond shaped symbols in FIG. 7). Microstructurally, this has been shown to be associated with the higher curvature of the TBC splats as a result of the flattening and spreading of impacting droplets during the spray coating over the predominant large radii convex asperities, as representatively depicted in FIG. 8a. This resulted in a bond coat-induced higher curvature splat morphology that changed the TBC microstructure locally (i.e. porosity content, intra-splat grain morphology and size, splat misalignment), thereby lowering the local compliance of the TBC and inhibiting the propagation of cracks. In contrast, the representative lower $S_{sth}$ interface topography shown in FIG. 8b depicts a less tortuous bond coat profile with lower curvature splat morphology as a result of smaller radius convex asperity distribution.

Thresholded Summit Area ($S_{sth}$) Measurement Methodology

Figure 9:
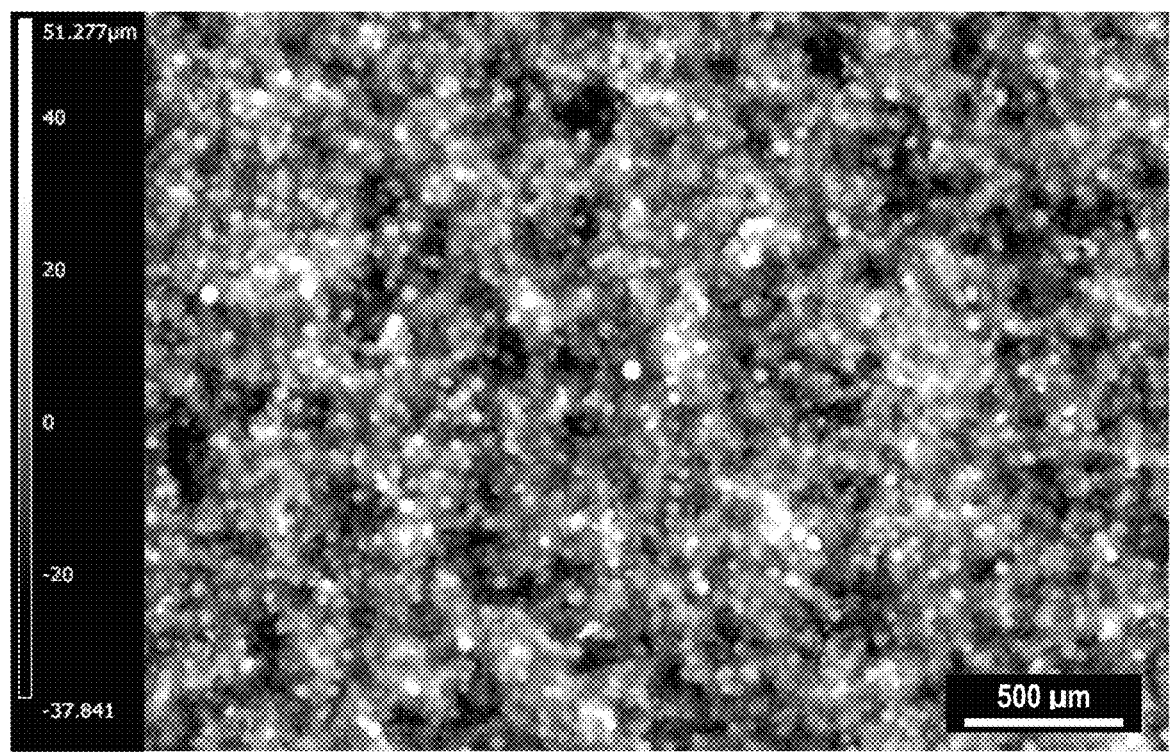
FIG. 9 is an example of a high $S_{sth}$ specimen height map, acquired by scanning the bond coat surface a high performance specimen.
Figure 10:
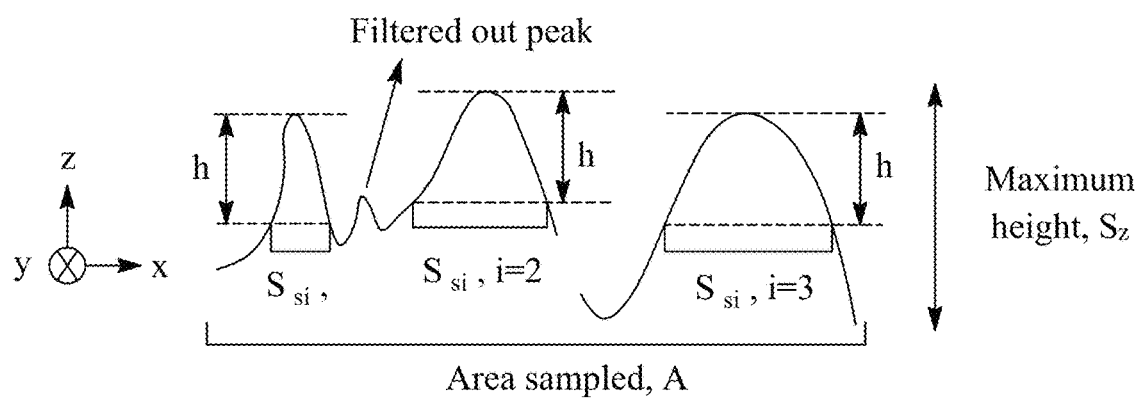
FIG. 10 is a diagram showing a cross-sectional representation of a bond coat wherein thermo-mechanically relevant summits are displayed.

1) Obtain the 3-D height map profile of a user-selected region of a surface using a line-of-sight high resolution optical imaging technique (e.g. confocal laser scanning microscopy). Subsequently, the experimental data and resulting height maps should undergo a post-processing treatment in order to ensure homogeneity amongst all specimens and minimise experimental error sources (i.e. measurement noise, surface contamination, imaging artefacts and specimen tilt). FIG. 9 provides a representative post-processed 8-bit colour height map of a bond coat interface surface profile obtained by confocal laser scanning microscopy. Topography height is differentiated by a grayscale colour gradient method, wherein higher relief regions are represented in white colour and lower relief regions in black colour. The recommended post-processing procedure is described below:
   a. Perform a plane tilt correction along the XX and YY axes to correct inherent specimen surface unevenness;
   b. Apply a linear smoothing filter to the dataset (e.g. median, Gaussian) with the purpose of simultaneously reducing measurement noise and removing non-relevant interfacial features (i.e. convex asperities with amplitudes below the desired tolerance);
   c. Filter out any erroneous data points revealing abnormally high/deep interfacial features (e.g. surface contamination, laser light entrapment limitations) by applying a standard intensity height cut level filter to replace erroneous pixels with homologous pixels resulting from an average pixel intensity calculated from the surrounding pixel matrix;
   d. Filter out any outlier height data corresponding to very low or high reflected laser intensities by using dark cut level (DCL) and bright cut level (BCL) correction filters (e.g. at 99% and 1%);
   e. Apply a low-pass filter (i.e. an S-filter as defined in ISO 25178-Part 607) in the micrometre range (e.g. at 5 or 8 μm) with the purpose of ensuring that any undesirable microroughness interfacial features are not included in the quantitative analysis of the $S_{sth}$ parameter;
2) Threshold the entire grayscale height map profile area according to one of the following methods described below and the schematic presented in FIG. 10 (which shows a cross sectional pictorial representation of the summit thresholding procedure using an extended maxima function with tolerance h, wherein $S_{si}$ is the individual thresholded area of each summit and A the total area sampled. $S_{sth}$ is expressed as a percentage and corresponds to the sum of all individual thresholded areas divided by the total area sampled):
   a. If the morphological features (i.e. amplitude, curvature and radii) of the convex asperities that comprise the multiple interfaces under analysis are within the same order of magnitude, the height map can be thresholded at a specific Z-axis height (e.g. h=15 μm) from the crest of the summit using an extended maxima function tool. Extended maxima are defined as a connected region that contains elements such that the difference of the height of each element within the region with the maximum height value within the region is lower than the tolerance, and such that all neighbour elements have height values smaller than the maximum within the region minus the tolerance;
   b. If the morphological features of all the interface height map profiles under analysis are not in the same order of magnitude, the height maps should instead be thresholded at a specific percentage of the maximum height of the distribution (e.g. optionally h=0.15 $S_z$ to h=0.20 $S_z$, where $S_z$ is the maximum feature height) using an extended maxima function tool. As a consequence, the significant variations of height distribution can then be taken into consideration whilst determining the $S_{sth}$.

Although the specific value selected for h will affect the calculated areas for the individual summits, and thus the value of the thresholded summit total area parameter, $S_{sth}$ (explained in the next step), that is not critical to the utility of the parameter. In different situations, different values may be suitable, for example in the range of 14 to 22% of $S_z$. As long as, for any given comparison, the same threshold height and methodology is used for all the bond coat interfaces and, the parameter provides a useful indicator of the quality of the surface(s) and allows for an effective prediction of the TBC lifetime. Such comparisons may be directly between samples, or may be with reference to a standardised approach in a given quality control process, for example.

Figure 11:
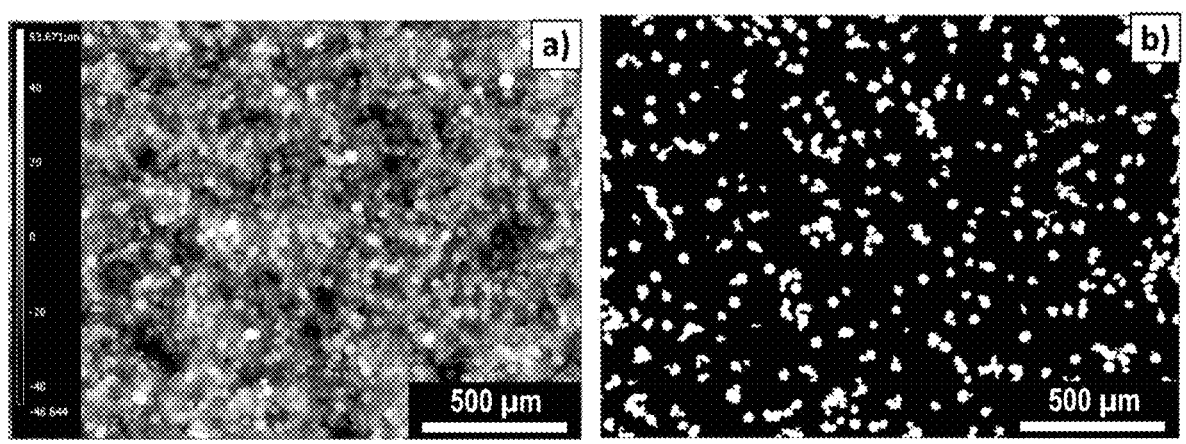
FIG. 11 illustrates thresholding of a height maps for the surface of a bond coat, with (a) showing an 8-bit grayscale height map and (b) the respective thresholded height map.

3) FIG. 11a illustrates a post-processed 8-bit grayscale height map obtained from confocal laser scanning microscopy. The respective thresholded height map is shown in FIG. 11b, revealing the thermo-mechanically dominant convex asperities found at the interface. From the thresholded height map (the output of the previous step), the area of each individual summit can be determined and the ratio between the sum of all thresholded summit areas of each summit and the total area sampled can be calculated, to give the thresholded summit total area, $S_{sth}$, as expressed by the following equation:

$$S_{sth} = \frac{1}{A}\sum_{i=1}^{n} S_{si}$$

where A is the total surface area sampled, n is the number of thermo-mechanically dominant summits present in the area sampled and $S_{si}$ is the area of an individual thresholded summit. As calculated above, the $S_{sth}$ is a fractional value between 0 and 1, which may also be presented as a percentage value.

INDUSTRIAL APPLICABILITY

The $S_{sth}$ parameter is novel in that it provides a new approach of accurately ascertaining and describing the relationship between the shape, size and frequency of the bond coat summits in a single surface topography parameter whilst effectively establishing a crucial link with the thermal strains generated in the TBC due to the coefficient of thermal expansion (CTE) mismatch between the substrate/bond coat and ceramic, as well as the compliance of the TBC adjacent to the interface.

Bond coats deposited to achieve interface topographies with high $S_{sth}$ values (e.g. greater than 11%, preferably greater than 11.5%, further preferably greater than 12%), are able to deliver consistently high TBC spallation performance, which in turn can be used to improve the temperature capability or durability of gas turbine engine components.

Accordingly, consistently high performing TBC coating systems can be manufactured within the supply chain despite the wide range of thermal spraying equipment and methodology used, which has not previously been possible.

Moreover, many previous approaches require multiple bond coat application steps or complex thermal spray powder fabrication which add complication and cost to the manufacturing process, whereas this invention enables single layer bond coat systems to be utilised from relatively simple thermal spray powders, whilst still obtaining high performance TBCs.

As such, the $S_{sth}$ parameter can be used to assess the quality of a bond coat for a ceramic coating on a metallic substrate. By determining the value of the $S_{sth}$ parameter, a quantitative assessment of the coating can be performed and such assessments could be used to determine the quality of an individual coating and assist in the estimation of the spallation lifetime without the need to perform thermal cycling. In other scenarios, the determination might be made as part of a method of optimising a process, comparing outputs from different process settings and selecting the conditions that provide the largest thresholded summit area.

Such optimised processes can be used to produce, for example, components for gas turbine engines, thereby improving the durability of such components and/or increasing the temperatures at which such components can be used.

Although discussed in detail with respect to thermal barrier coatings, the advantages of improved spallation lifetimes due to improved adhesion to the bond coat are also applicable to other coating scenarios, such as wear resistant ceramic-coated materials; environmental barrier coatings (including rare-earth oxide-silicates); and abradable ceramic coatings. Such coatings may be applied by any of a variety of methods including air plasma spraying (APS); high velocity oxygen fuel thermal spraying (HVOF); high velocity air fuel spraying (HVAF); low pressure plasma spraying (LPPS)/vacuum plasma spraying (VPS); suspension plasma spraying (SPS); solution pre-cursor plasma spraying (SPS); plasma spray physical vapour deposition (PS-PVD); slurry deposition and combinations thereof.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A bond coat for bonding a ceramic coating to a metallic substrate, wherein the bond coat has a thresholded summit area, $S_{sth}$, of 11% or more, wherein the thresholded summit area, $S_{sth}$, is given by:

$$S_{sth} = \frac{1}{A} \sum_{i=1}^{n} S_{si}$$

where A is the total surface area sampled, n is the number of thermo-mechanically dominant summits present in the area sampled and $S_{si}$ is the area of an individual thresholded summit.

2. The bond coat according to claim 1, wherein the bond coat material is a metallic alloy.

3. The bond coat according to claim 2, wherein the metallic alloy contains aluminum, silicon, or chromium.

4. The bond coat according to claim 1, wherein the bond coat is applied to the metallic substrate using one or more thermal spraying processes from among air plasma spraying (APS); high velocity oxygen fuel thermal spraying (HVOF); high velocity air fuel spraying (HVAF); low pressure plasma spraying (LPPS)/vacuum plasma spraying (VPS); or cold spraying.

5. A ceramic coating system comprising the bond coat according to claim 1, wherein the ceramic coating system further comprises:
a metallic substrate; and
a ceramic layer;
wherein the bond coat is formed on the metallic substrate, and the ceramic layer is formed on the bond coat.

6. The ceramic coating system according to claim 5, wherein the ceramic coating system is a thermal barrier coating system.

7. A component for a gas turbine engine, the component comprising a ceramic coating system according to claim 5.

8. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft,
wherein a component of the gas turbine engine is a component according to claim 7.

9. The gas turbine engine according to claim 8, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *